United States Patent
Wei et al.

(10) Patent No.: US 12,173,181 B2
(45) Date of Patent: Dec. 24, 2024

(54) EPOXY-CURABLE SILICONE RELEASE COATING COMPOSITION AND METHODS FOR ITS PREPARATION AND USE

(71) Applicant: Dow Silicones Corporation, Midland, MI (US)

(72) Inventors: Yanhu Wei, Midland, MI (US); Zhenbin Niu, Midland, MI (US); Peng-Fei Fu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 157 days.

(21) Appl. No.: 17/915,194

(22) PCT Filed: May 12, 2021

(86) PCT No.: PCT/US2021/031889
§ 371 (c)(1),
(2) Date: Sep. 28, 2022

(87) PCT Pub. No.: WO2021/247210
PCT Pub. Date: Dec. 9, 2021

(65) Prior Publication Data
US 2023/0130539 A1     Apr. 27, 2023

Related U.S. Application Data

(60) Provisional application No. 63/034,537, filed on Jun. 4, 2020.

(51) Int. Cl.
*C09D 183/06*     (2006.01)
*C08G 77/06*      (2006.01)
*C08G 77/14*      (2006.01)

(52) U.S. Cl.
CPC ........... *C09D 183/06* (2013.01); *C08G 77/06* (2013.01); *C08G 77/14* (2013.01)

(58) Field of Classification Search
CPC .................................................... C08G 77/08
See application file for complete search history.

(56) References Cited

U.S. PATENT DOCUMENTS

| | | | |
|---|---|---|---|
| 5,721,290 A | 2/1998 | Eckberg et al. | |
| 5,866,261 A | 2/1999 | Kerr, III et al. | |
| 7,064,173 B2 | 6/2006 | Rubinsztajn et al. | |
| 7,906,605 B2 | 3/2011 | Cray et al. | |
| 8,048,819 B2 | 11/2011 | Rubinsztajn et al. | |
| 8,470,899 B2 | 6/2013 | Maliverney | |
| 8,629,222 B2 | 1/2014 | Takizawa et al. | |
| 8,968,868 B2 | 3/2015 | Yang et al. | |
| 9,006,336 B2 | 4/2015 | Yang et al. | |
| 9,006,357 B2 | 4/2015 | Yang et al. | |
| 9,035,008 B2 | 5/2015 | Yang et al. | |
| 10,259,908 B2 | 4/2019 | Arkles et al. | |
| 2003/0139287 A1 | 7/2003 | Deforth et al. | |
| 2006/0211836 A1 | 9/2006 | Rubinsztajn et al. | |
| 2006/0241271 A1 | 10/2006 | Rubinsztajn et al. | |
| 2006/0280957 A1 | 12/2006 | Lee et al. | |
| 2006/0293172 A1 | 12/2006 | Rubinsztajn et al. | |
| 2008/0281469 A1 | 11/2008 | Choi et al. | |
| 2010/0144960 A1 | 6/2010 | Cray et al. | |
| 2013/0234070 A1 | 9/2013 | Mowrer | |
| 2015/0141570 A1 | 5/2015 | Buckanin et al. | |
| 2016/0289388 A1 | 10/2016 | Fu et al. | |
| 2017/0129998 A1 | 5/2017 | Arkles et al. | |

FOREIGN PATENT DOCUMENTS

| | | | |
|---|---|---|---|
| CA | 2894146 A1 | 6/2014 | |
| CN | 1989178 A | 6/2007 | |
| CN | 104877310 A | 9/2015 | |
| CN | 103189413 B | 11/2015 | |
| FR | 2824835 A1 * | 11/2002 | ............. C08G 77/08 |
| JP | 5814478 B2 | 11/2015 | |
| WO | 2012060449 A1 | 5/2012 | |
| WO | 2013142956 A1 | 10/2013 | |
| WO | 2020/247329 A1 | 12/2020 | |
| WO | 2020/247337 A1 | 12/2020 | |
| WO | WO-2020247338 A1 * | 12/2020 | ............. C08G 77/08 |

OTHER PUBLICATIONS

Asenjo-Sanz, "Zwitterionic Polymerization of Glycidyl Monomers to Cyclic Polyethers with B(C6F5)3", Polymer Chemistry, 2014, pp. 1-4.
Berkefeld, "Tandem Frustrated Lewis Pair/Trisborane-Catalyzed Deoxygenative Hydrosilylation of Carbon Dioxide", JACS, 2010, vol. 132, pp. 10060-10661.
Brook, "New Control Over Silicone Synthesis using SiH Chemistry: The Piers-Rubinsztajn Reaction", Chem. Eur. J., 2018, vol. 24, pp. 8458-8469.
Cella, "Preparation of Polyaryloxysilanes and Polyaryloxysiloxanes by B(C6F5)3 Catalyzed Polyetherification of Dihydrosilanes and Bis-Phenols", Macromolecules, 2008, vol. 41, pp. 6965-6971.
Chakraborty, "Catalytic ring-opening polymerization of propylene oxide by organoborane and aluminum Lewis acids", Macromolecules, 2003, vol. 36, pp. 5470-5481.
Chen, "B(C6F5)3-Catalyzed Group Transfer Polymerization of Acrylates Using Hydrosilane: Polymerization Mechanism, Applicable Monomers, and Synthesis of Well-Defined Acrylate Polymers", Macromolecules, 2019, vol. 52, pp. 844-856.
Chojnowski, "Hydride Tranfer Ring-Opening Polymerization of a Cyclic Oligomethylhydrosiloxane. Route to a Polymer of Closed Multicyclic Structure", Macromolecules, 2012, vol. 45, pp. 2654-2661.

(Continued)

*Primary Examiner* — Marc S Zimmer
(74) *Attorney, Agent, or Firm* — Catherine U. Brown

(57) ABSTRACT

An epoxy-curable silicone release coating composition and methods for its preparation and use are provided. The composition contains an inhibited Lewis acid catalyst. Releasing the Lewis acid catalyst from the inhibitor allows the Lewis acid to catalyze cure of the epoxy-groups. The composition can be coated on various substrates and cured to form a release liner.

11 Claims, No Drawings

(56) References Cited

OTHER PUBLICATIONS

Chojnowski, "Mechanism of the B(C6F5)3-Catalyzed Reaction of Silyl Hydrides with Alkoxysilanes. Kinetic and Spectroscopic Studies", Organometallics, 2005, vol. 24, pp. 6077-6084.

Chojnowski, "Oligomerization of Hydrosiloxanes in the Presence of Trisborane", Macromolecules, 2006, vol. 39, pp. 3802-3807.

Fawcett, "Rapid, Metal-Free Room Temperatrue Vulcanization Produces Silicone Elastomers", Journal of Polymer Science, 2013, vol. 51, pp. 644-652.

Fuchise, "B(C6F5)3-Catalyzed Group Transfer Polymerization of n-Butyl Acrylate with Hydrosilane through In Situ Formation of Initiator by 1,4-Hydrosilylation of n-Butyl Acrylate", ACS Macro Lett., 2014, pp. 1015-1019, vol. 3.

Grande, "Rapid assembly of explicit, functional silicones", Dalton Trans., 2010, vol. 39, pp. 9369-9378.

Grande, "Testing the functional tolerance of the Piers-Rubinsztajin reaction: a new strategy for functional silicones", Chem. Comm., 2010, vol. 46, pp. 4988-4990.

Herzberger, "Polymerization of Ethylene Oxide, Propylene Oxide, and Other Alkylene Oxides: Synthesis, Novel Polymer Architectures, and Bioconjugation", Chem. Rev., 2016, vol. 116, pp. 2170-2243.

Hoque, "Polysiloxanes with Periodically Distrubuted Isomeric Double-Decker Silsesquioxane in the Main Chain", Macromolecules, 2009, vol. 42, pp. 3309-3315.

Khalimon et al., "A Photo Lewis Acid Generator (PhLAG): Controlled Photorelease of B(C6F5)3," JACS, 2012, vol. 134, pp. 9601-9604.

Khalimon, "Photo Lewis acid generators: photorelease of B(C6F5)3 and applications to catalysis", Dalt. Trans., 2015, vol. 44, pp. 18196-18206.

Kim, "Metal-Free Hydrosilylation Polymerization by Borane Catalyst", Angew. Chem. Int. Ed, 2015, vol. 54, pp. 14805-14809.

Lambert, "A Stable B-Silyl Carbocation", J. Am. Chem. Soc., 1996, vol. 118, pp. 7867-7868.

Lambert, "B-Silyl and B-Germyl Carbocations Stable at Room Temperature", J. Org. Chem., 1999, vol. 64, pp. 2729-2736.

Matsumoto, "One-Pot Sequence-Controlled Synthesis of Oligosiloxanes", Angew. Chem. Int. Ed., 2018, vol. 57, pp. 4637-4641.

Momming, "Reversible Metal-Free Carbon Dioxide Binding by Frustrated Lewis Pairs", Angewandte Chemie International Edition, 2009, vol. 48, No. 36, pp. 6643-6646.

Dertle, "Hyrdrosilylation of Tetrasubstituted Olefins", Tetrahedron Letters, 1985, vol. 26, No. 45, pp. 5511-5514.

Oestreich, "A unified survey of Si—H and H—H bond activation catalysed by electron-deficient boranes", Chem. Soc. Rev., 2015, vol. 44, pp. 2202-2220.

Perez, "Olefin Isomerization and Hydrosilylation Catalysis by Lewis Acidic Organofluorophosphonium Salts", JACS, 2013, vol. 135, pp. 18308-18310.

Simmonneau, "3-Silylated Cyclohexa-1-4-dienes as Precursors for Gaseous Hydrosilanes: The B(C6F5)3-Catalyzed Transfer Hydrosilylation of Alkenes", Angew. Chem. Int. Ed., 2013, vol. 52, pp. 11905-11907.

Song, "Lewis Acid-Catalyzed regio- and Stereoselective Hydrosilylation of Alkenes and Trialkylsilanes", Organometallics, 1999, vol. 18, pp. 3109-3115.

Stephan, "Frustrated Lewis Pair Chemistry: Development and Perspectives", Angew. Chem. Int. Ed., 2015, vol. 54, pp. 6400-6441.

Stephan, "Frustrated Lewis Pairs", JACS, 2015, vol. 137, pp. 10018-10032.

Zhang, "Piers' borane-mediated hydrosilylation of epoxides and cyclic ethers", Chem. Commun., 2018, vol. 54, pp. 7243-7246.

\* cited by examiner

EPOXY-CURABLE SILICONE RELEASE COATING COMPOSITION AND METHODS FOR ITS PREPARATION AND USE

CROSS REFERENCE TO RELATED APPLICATIONS

This application is a U.S. national stage filing under 35 U.S.C. § 371 of PCT Application No. PCT/US21/031889 filed on 12 May 2021, currently pending. which claims the benefit of U.S. Provisional Patent Application No. 63/034,537 filed 4 Jun. 2020 under 35 U.S.C. § 119 (e). PCT Application No. PCT/US21/031889 and U.S. Provisional Patent Application No. 63/034,537 are each hereby incorporated by reference.

FIELD

This invention relates to an epoxy-curable silicone release coating composition and methods for its preparation and use. The composition contains an inhibited Lewis acid catalyst. Releasing the Lewis acid catalyst from the inhibitor allows the Lewis acid to catalyze cure of the epoxy-groups. The composition is suitable for coating on various substrates, including substrates that may be temperature sensitive.

INTRODUCTION

Thermally curable silicone release coatings are often prepared by platinum catalyzed hydrosilylation of a curable composition including a vinyl terminated polydiorganosiloxane base polymer, a polyorganohydrogensiloxane crosslinker, a platinum catalyst, and other additives. The compositions may be stored under conditions to avoid premature cure and are typically mixed shortly before use. The curable composition can then begin to cure.

The substrates for release liners have traditionally been paper, and the temperature at which the polysiloxane based release coating is cured is usually at least 130° C. There is a need in the release coating industry for curable compositions to cure efficiently and effectively at lower temperatures for several reasons. First, there is a growing desire in the release coating industry to use thermally sensitive substrates, which cannot withstand high curing temperature. For example, thermal paper may change color at temperature above 100° C. And, lowering curing temperature can save energy from oven heating and improve sustainability. Finally, high curing temperature can cause paper substrates to lose moisture, leading to a paper curling problem, which creates a need for an additional re-moisturization process step after curing the release coating composition. An efficient lower curing temperature is desired to mitigate the moisture loss issue and avoid the re-moisturization, which would simplify the production process and reduce production cost.

Commercially available thermally curable silicone release coating compositions typically do not perform well at lower cure temperatures due to the competing desires to achieve both 1) fast cure with good anchorage and 2) long bath life. Generally, in the release coating industry, it is desirable for a silicone release coating layer to be fully cured and well anchored to the substrate to avoid silicone transfer after 1-5 seconds of heating on a coater. At the same time, sufficient working time at typical working temperatures (e.g., RT to 40° C.) is desired to allow operators to prepare the coater and finish the coating process. Thermally curable silicone release coating compositions which cure via hydrosilylation reaction typically are stored in two parts, e.g., a base part including a base polymer and crosslinker, and a curing agent part including a platinum catalyst. An inhibitor, such as 1-ethynyl-1-cyclohexanol (ETCH) is typically added to one or both parts, and the parts are mixed shortly before use in a coating bath. The catalyst and inhibitor work together to afford longer enough coating bathlife after the parts are mixed to afford acceptable working times of the release coating bath before cure. If coating bath life of a release coating composition is too short, there is a risk of gelling the coating bath, piping, or other parts of the coating equipment.

Commonly, fast cure and longer enough bath life are achieved by selecting a catalyst/inhibitor combination and optimizing their relative amounts to achieve desired bulk bath life at the working temperature. The curable release coating composition is coated on a substrate to form a layer, which is cured at a temperature (e.g., 130° C.) much higher than the than working temperature to achieve fast cure. However, at lower curing temperatures, the difference between working temperature and curing temperature may be too narrow to achieve both long bathlife and fast cure with good anchorage. Thus, the lower temperature curing release coating market is occupied by irradiation curable systems, such as UV curable silicone release coating. However, the UV cure systems have cost and performance issues.

Therefore, this is an industry need for a new thermally curable silicone release coating composition that can afford fast, complete cure, with good anchorage to substrates while curing at relatively low temperatures.

SUMMARY

An epoxy-curable silicone release coating composition comprises (A) an epoxy-functional polyorganosiloxane having at least 2 cyclic epoxy-functional groups per molecule, and (B) an inhibited catalyst comprising a fluorinated triaryl borane. The epoxy-curable silicone release coating composition may be coated on a surface of a substrate and cured at low temperature to form a release liner.

DETAILED DESCRIPTION

An epoxy-curable silicone release coating composition comprises:
(A) an epoxy-functional polyorganosiloxane comprising unit formula
$(R^1R^2R^3SiO_{1/2})_a(R^1R^2SiO_{2/2})_b(R^1SiO_{3/2})_c(SiO_{4/2})_d$ $(ZO_{1/2})_e$, where each $R^1$, each $R^2$, and each $R^3$ are independently selected from the group consisting of a monovalent hydrocarbon group of 1 to 30 carbon atoms and a monovalent hydrocarbon group of 1 to 30 carbon atoms functionalized with a cyclic epoxy-functional group, with the proviso that at least two $R^1$ per molecule is the monovalent hydrocarbon group of 1 to 30 carbon atoms functionalized with the cyclic epoxy-functional group; Z is H or methyl; subscript a≥1, subscript b≥0, subscript c≥0, subscript d≥0, subscript e≥0, and 2≤(a+b+c+d)≤1000;
(B) an inhibited catalyst selected from the group consisting of
(B-1) a complex comprising
(i) a fluorinated triaryl borane; and
(ii) an amine of formula $R^4R^5R^6N$, where the nitrogen is not a member of an N=C—N linkage, and where each of $R^4$, $R^5$, and $R^6$ is independently selected from the group consisting of hydrogen, alkyl, and substituted alkyl, and each of $R^4$, $R^5$, and $R^6$ is connected to the nitrogen by a non-conjugated carbon; and (B-2) a Bridged Frustrated Lewis Pair comprising a complex of
(i) the fluorinated triaryl borane;
(ii) a Lewis base selected from the group consisting of $PR^7_3$, $P(NR^7_2)_3$, $NR^7_3$, $N(SiR^7_3)_xR^7_{3-x}$, $R^7C(NR^7)N$, $P(N-R^7)R^7_3$ and

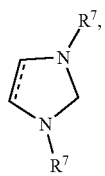

where each $R^7$ is independently selected from the group consisting of hydrogen, alkyl, substituted alkyl, aryl, and substituted aryl; and
(iii) a bridging molecule connecting the fluorinated triaryl borane and the Lewis base, where the bridging molecule is selected from the group consisting of carbon dioxide, $H_2$, nitriles, alkenes, alkynes, ketones, esters and aldehydes (A) Epoxy-Functional Polyorganosiloxane Starting material (A) in the epoxy-curable silicone release coating composition is an epoxy-functional polyorganosiloxane having, per molecule, at least one cyclic epoxy-functional group. Starting material (A) may have unit formula:
$(R^1R^2R^3SiO_{1/2})_a(R^1R^2SiO_{2/2})_b(R^1SiO_{3/2})_c(SiO_{4/2})_d$ $(ZO_{1/2})_e$, where each $R^1$, each $R^2$, and each $R^3$ are independently selected from the group consisting of a monovalent hydrocarbon group of 1 to 30 carbon atoms and a monovalent hydrocarbon group of 1 to 30 carbon atoms functionalized with a cyclic epoxy-functional group, with the proviso that at least two instances of $R^1$ per molecule are each the monovalent hydrocarbon group of 1 to 30 carbon atoms functionalized with the cyclic epoxy-functional group; Z is H or methyl; subscript a≥1, subscript b≥0, subscript c≥0, subscript d≥0, subscript e≥0, and 2≤ (a+b+c+d)≤1000. Alternatively, subscript a may be ≥2. Alternatively, subscript e may be 0, e.g., when starting material (A) is linear. Alternatively, subscript e may be greater than 0 to a value sufficient to provide an OZ content up to 35 mol % of the epoxy-functional polyorganosiloxane, e.g., when the epoxy-functional polyorganosiloxane is a resin.

Examples of monovalent hydrocarbon groups for $R^1$, $R^2$, and $R^3$ include alkyl, aryl, and alkenyl groups. Alternatively, the alkyl group may have 1 to 20 carbon atoms; the alkenyl group may have of 2 to 20 carbon atoms; and the aryl group may have 6 to 20 carbon atoms. Suitable alkyl groups include methyl, ethyl, and propyl (including n-propyl and isopropyl). Suitable alkenyl groups include vinyl, allyl, and hexenyl. Suitable aryl groups include phenyl, tolyl, xylyl, naphthyl, 1-phenylethyl and 2-phenylethyl. Alternatively, each $R^1$, $R^2$, and $R^3$ not including the cyclic epoxy-functional group may be independently selected from the group consisting of methyl, vinyl, and phenyl.

The cyclic epoxy-functional group means a group having carbon atoms of the epoxide functionality that are both bound directly to one another to form a 3-membered cyclic epoxide functionality and are also directly or, more typically, indirectly through other atoms bound to one another in a second bond or chain of bonds. For example, the cyclic epoxy-functional group may be a cyclohexene oxide-functional group of formula

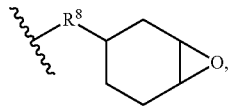

where $R^8$ is covalent bond or a divalent hydrocarbon group. For example, the divalent hydrocarbon group may be an alkylene group such as methylene, ethylene, propylene, butylene, hexylene, or octylene; an arylene group such as phenylene, or an alkylarylene group such as:

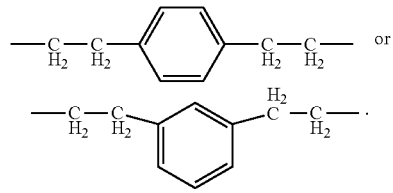

Alternatively, each $R^8$ is an alkylene group such as ethylene, propylene, or octylene.

Alternatively, the epoxy-functional polyorganosiloxane may be linear. The linear epoxy-functional polyorganosiloxane may have the cyclic epoxy-functional group in terminal positions, in pendant positions, or both terminal and pendant positions. Suitable linear epoxy-functional polyorganosiloxanes may have unit formula $(R^1R^2R^3SiO_{1/2})_2$ $(R^1R^2SiO_{2/2})_b$, where $R^1$, $R^2$, $R^3$, and subscript b are as described above. Alternatively, each $R^1$ may be independently selected from the group consisting of an alkyl group and an alkyl group functionalized with a cyclic epoxy-functional group, each $R^2$ may be an alkyl group, and each $R^3$ may be an alkyl group. Subscript b in the linear epoxy-functional polyorganosiloxane may have has an average value of at least 5, alternatively at least 10, alternatively at least 20, alternatively at least 30, alternatively at least 40, alternatively at least 50, and alternatively at least 60. At the same time, subscript b may have a value up to 1,000; alternatively up to 900; alternatively up to 800, alternatively up to 700, alternatively up to 600, alternatively up to 500; alternatively up to 400; alternatively up to 300, alternatively up to 250; and alternatively up to 200. For example, subscript b may be to 1,000; alternatively 5 to 900; alternatively 10 to 300; alternatively 20 to 250; and alternatively 30 to 200.

Examples of linear epoxy-functional polyorganosiloxanes that may be used herein include a bis-trimethyl-siloxy terminated poly(dimethyl/methyl,ethylcyclohexene epoxide)siloxane copolymer; a bis-trimethyl-siloxy terminated poly(methyl,ethylcyclohexene epoxide)siloxane homopolymer; or a bis-ethylcyclohexene epoxide terminated polydimethylsiloxane. The linear epoxy-functional polyorganosiloxanes may be prepared by known methods, such as those disclosed below in the examples, by varying appropriate starting materials. Linear epoxy-functional polyorganosiloxanes are also commercially available from Gelest, Inc. of Morrisville, Pennsylvania, USA.

Alternatively, the epoxy-functional polyorganosiloxane may be branched. The branched epoxy-functional polyorganosiloxane may have unit formula $(R^1R^2R^3SiO_{1/2})_a$ $(R^1SiO_{3/2})_c(SiO_{4/2})_d$, where each $R^1$ is as described above, subscript a is >1, subscript c>1, and subscript d>1. Alternatively, each $R^1$ may be independently selected from the group consisting of an alkyl group and an alkyl group functionalized with a cyclic epoxy-functional group, each $R^2$ may be an alkyl group, each $R^3$ may be an alkyl group, subscript a>1, subscript c>1, and subscript d>1. Alternatively a may be greater than 2; alternatively a may be greater than 4. The branched epoxy-functional polyorganosiloxane may have a number average molecular weight (Mn)>2,000 g/mol. Alternatively, Mn may be>2,000 g/mol to 200,000 g/mol. Mn may be measured by gel permeation chromatography (GPC) according to the following method. The equipment used comprises a Waters 2695 Separation Module with a vacuum degasser and a Waters 410 differential refractometer. Use two (300 millimeter by 7.5 millimeter) Polymer Laboratories PLgel 5 micrometers Mixed-C columns (molecule weight separation range of 200-2,000,000), preceded by a PLgel 5 micrometer guard column (50 millimeters by 7.5 millimeters). Use certified grade tetrahydrofuran (THF) flowing at 1.0 milliliters per minute as the eluent while maintaining the column and detector at 35° C. Prepare samples in THF at 0.15 volume-percent concentration and allow to solvate for three hours with occasional shaking, and filter through a 0.45 micrometer polytetrafluoroethylene syringe filter prior to analysis. Inject 100 microliters of sample for analysis and collect data for 25 minutes. Collect data and conduct analysis using ThermoLabsystems Atlas chromatography software and Polymer Laboratories Cirrus GPC software. Molecular weight averages are relative to a calibration curve ($3^{rd}$ order) created suing polystyrene standards covering the molecular weight range of 580 to 2,300,000.

Alternatively, the branched epoxy-functional polyorganosiloxane has unit formula may have unit formula $[(CH_3)_3SiO_{1/2}]_a(R^{CEP}SiO_{3/2})_c(SiO_{4/2})_d$, where $R^{CEP}$ represents a group of formula

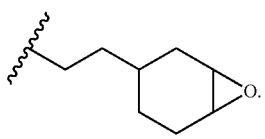 [SMILES: *CCC1CCC2OC2C1]

The branched or resinous epoxy-functional polyorganosiloxanes described above may be prepared by known methods, for example, according to the examples provided herein by varying appropriate starting materials or the method disclosed in U.S. Patent Application Publication 2016/0289388 to Fu, et al.

(B) Inhibited Catalyst

Starting material (B) in the epoxy-curable silicone release coating composition is an inhibited catalyst. The inhibited catalyst comprises (i) a fluorinated triaryl borane. The fluorinated triaryl borane has formula

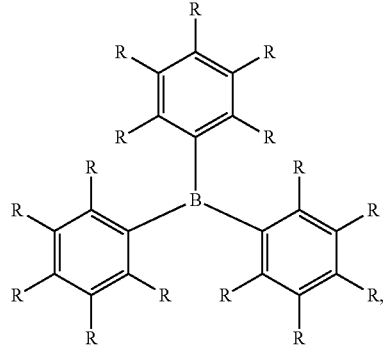

where each R is independently selected from the group consisting of H, F and $CF_3$, with the proviso that at least one instance of R per molecule is F or $CF_3$. Examples of fluorinated triaryl boranes of this formula include $B(C_6F_5)_3$, $B(C_6H_5)(C_6F_5)_2$, $B(C_6H_5)_2(C_6F_5)$, $B(C_6H_2F_3)_3$, $B(C_6H_3F_2)_3$, and $B(C_6H_4F)_3$. Alternatively, the fluorinated triaryl borane may be tris(pentafluorophenyl)borane of formula $B(C_6F_5)_3$. The fluorinated triaryl boranes are commercially available.

The inhibited catalyst may be (B-1) a complex comprising (i) the fluorinated triaryl borane described above and (ii) an amine of formula $R^4R^5R^6N$, where the nitrogen atom (N) is not a member of an N=C—N linkage, and where each of $R^4$, $R^5$, and $R^6$ is independently selected from the group consisting of hydrogen and alkyl, and substituted alkyl. Each of $R^4$, $R^5$, and $R^6$ may be connected to the nitrogen by a non-conjugated carbon. The alkyl group may be as described above for $R^2$. The amine may be a trialkyl amine. Suitable trialkyl amines include triethylamine, tripropylamine, tributylamine, tripentylamine and trihexylamine.

Complexes of (i) the fluorinated triaryl borane and (ii) the amine described above may be prepared as described in U.S. Provisional Patent Application Ser. No. 62/856,778 filed 19 Jun. 2019 corresponding to U.S. Patent Application Publication Number 2022-0162394.

Alternatively, the inhibited catalyst may be (B-2) a Bridged Frustrated Lewis Pair comprising a complex comprising (i) the fluorinated triaryl borane described above, (ii) a Lewis base selected from the group consisting of $PR^7_3$, $P(NR^7_2)_3$, $NR^7_3$, $N(SiR^7_3)_xR^7_{3-x}$, $R^7(NR^7)N$, $P(N—R^7)R^7_3$ and

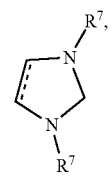

where each $R^7$ is independently selected from the group consisting of hydrogen, alkyl, substituted alkyl, aryl, and substituted aryl; and (iii) a bridging molecule connecting the fluorinated triaryl borane and the Lewis base, where the bridging molecule is selected from the group consisting of carbon dioxide, $H_2$, nitriles, alkenes, alkynes, ketones, esters and aldehydes. The alkyl group and the aryl group may be as described above for $R^2$. Alternatively, the Lewis base may be $PR^7_3$, where each $R^7$ is an alkyl group. Alternatively, the bridging molecule may be carbon dioxide.

Bridged Frustrated Lewis Pairs may be prepared as described in U.S. Provisional Patent Application Ser. No. 62/856,774 filed 19 Jun. 2019 corresponding to U.S. Patent Application Publication Number 2022-0195144.

The epoxy-curable silicone release coating composition may comprise starting materials (A) and (B) described above. Alternatively, the epoxy-curable silicone release coating composition may consist essentially of starting materials (A) and (B) described above. Alternatively, the epoxy-curable silicone release coating composition may consist of starting materials (A) and (B) described above.

The epoxy-curable silicone release coating composition described above may further comprise one or more optional starting materials. Examples of possible optional starting materials include one or a combination of more than one component selected from the group consisting of organic solvents (typically at a concentration of 10% or less, alternatively 5% or less, and alternatively 1% or less based on the total composition weight), pigments (e.g., carbon black, titanium dioxide), fillers such as metal oxides including $SiO_2$ (typically at a concentration of 50% or less based on the total composition weight), moisture scavengers, fluorescent brighteners, stabilizers (such as antioxidants and ultraviolet stabilizers), and corrosion inhibitors.

Method of Making the Epoxy-Curable Silicone Release Coating Composition

The epoxy-curable silicone release coating composition may be prepared by any convenient means, such as mixing, under ambient conditions, starting materials comprising (A) and (B), as described above.

Method of Making a Release Liner

The epoxy-curable silicone release coating composition (composition) can be used to prepare a release liner in a method comprising applying the composition to a surface of a substrate and curing the composition. The composition can for example be applied to the substrate by any convenient means such as spraying, doctor blade, dipping, screen printing or by a roll coater, e.g. an offset web coater, kiss coater or etched cylinder coater.

The substrate may be, for example a polymer film substrate such as polyester, particularly polyethylene terephthalate (PET); polyethylene, e.g., high density polyethylene (HDPE) or low density polyethylene (LDPE); polypropylene (PP); biaxially oriented polypropylene (BOPP); or polystyrene films. Alternatively, the substrate may be a paper substrate, including plastic coated paper, for example paper coated with polyethylene (such as polyethylene coated Kraft Paper), glassine, super calendar paper, or clay coated Kraft. Alternatively, the paper substrate may be a thermal paper. Alternatively, the substrate may be a thermally sensitive substrate such as thermal paper, LDPE, HDPE, PP, BOPP, or polyethylene coated Kraft paper.

The method may further comprise: 3) treating the surface of the substrate before applying the composition thereto. Treating the substrate may be performed by any convenient means such as a plasma treatment or a corona discharge treatment. Alternatively, the substrate may be treated by applying a primer. In certain instances anchorage of the release coating may be improved if the substrate treated before coating.

The method may further comprise: 4) curing the composition to form a silicone release coating on the surface of the substrate. Curing may be performed by any conventional means such as heating. When the substrate comprises thermal paper, heating may be performed at a temperature of no more than 100° C., alternatively no more than 95° C., alternatively no more than 90° C., alternatively no more than 85° C., and alternatively no more than 80° C. Alternatively, heating may be performed at 50° C. to <100° C.; alternatively 70° C. to <100° C.; alternatively 70° C. to 90° C.; and alternatively 80° C. to 95° C.

Heating may be performed for a time sufficient to cure the epoxy-curable silicone release coating composition to form a silicone release coating. The time depends on various factors including the thickness of curable silicone release coating composition on the substrate and the temperature, however the time may be 1 second to 1 minute, alternatively 10 seconds to 50 seconds. Under production coater conditions, cure can be effected in a residence time of 1 second to 6 seconds, alternatively from 1.5 seconds to 3 seconds, at an air temperature described above. Heating may be performed in an oven, e.g., an air circulation oven or tunnel furnace or by passing the coated substrate around heated cylinders. Thickness of the silicone release coating is not specifically restricted, but may range from 0.5 μm to 2 μm, alternatively 1 μm.

EXAMPLES

Table 1 shows abbreviations and starting materials used in the examples below.

| Abbreviation | Definition |
| --- | --- |
| AGE | Allyl glycidyl ether |
| BCF | tris(pentafluorophenyl)borane, $B(C_6F_5)_3$ |
| Me | methyl |
| CEP | an ethylcyclohexane epoxide group of formula: |

| | |
| --- | --- |
| M | Monofunctional siloxane unit of formula $Me_3SiO_{1/2}$, |
| $M^H$ | Monofunctional siloxane unit of formula $Me_2HSiO_{1/2}$ |
| D | Difunctional siloxane unit of formula $Me_2SiO_{2/2}$ |
| $D^H$ | Difunctional siloxane unit of formula $MeHSiO_{2/2}$ |
| $D^{CEP}$ | Difunctional siloxane unit of formula $Me(CEP)SiO_{2/2}$ |
| T | Trifunctional siloxane unit of formula $MeSiO_{3/2}$ |
| $T^H$ | Trifunctional siloxane unit of formula $HSiO_{3/2}$ |
| $T^{CEP}$ | Trifunctional siloxane unit of formula $(CEP)SiO_{3/2}$ |
| Q | Quadrifunctional siloxane unit of formula $SiO_{4/2}$ |
| TBA | tributylamine |
| TEA | Triethylamine |
| TPA | Triphenylamine |
| TBP | tri-tert-butyl phosphine |
| GP | Glassine paper |
| TP | Thermal paper |
| RT or rt | Room temperature of 25° C. ± 5° C. |

In this Reference Example 1, starting materials were synthesized as follows.

Synthesis of $MD^H{}_{65}M$ Silyl Hydride: To a 3-necked flask fitted with a mechanical stirrer was added 40 g deionized water, 10 g heptane and 0.05 g tosylic acid. While mixing the flask contents, a mixture of 200 g methyldichlorosilane and 10 g trimethylchlorosilane was added to the flask dropwise over 30 minutes. The flask contents were stirred for an additional 60 minutes at 23° C. The resulting reaction solution was washed three times with 50 mL deionized water each time. The resulting washed solution was dried with anhydrous sodium sulfate and filtered through activated carbon. Volatiles were removed with a rotary evaporator to obtain $MD^H{}_{65}M$ Silyl Hydride.

Synthesis of $MD_{60.5}D^H{}_{7.5}M$: To a three-neck flask installed with mechanical stir was added 60 g deionized water, 15 g heptane, and 0.075 g tosylic acid. A mixture of 270 g dimethyldichlorosilane, 28 g methyldichlorosilane, and 15 g trimethylchlorosilane was added dropwise into the flask while stirring over 30 min. After one hour stirring at 23° C., the resulting reaction solution was washed 3 times with 80 milliliters deionized water, dried with anhydrous sodium sulfate, and filtered through an activated carbon layer. Volatiles were removed with a rotary evaporator to obtain the polymerization product $MD_{60.5}D^H{}_{7.5}M$.

Synthesis of $MD_{60.5}D^{CEP}{}_{7.5}M$: To a 500 mL 3N dry flask were added 110.7 g (0.163 mol SiH) $MD_{60.5}D^H{}_{7.5}M$, 2 ppm Pt (Karstedt's catalyst)) and 80 g toluene, followed by heating to 80° C. 30.4 g (0.245 mol) 4-Vinyl-cyclohexene oxide in 30 g toluene was added dropwise within 30 min at 80° C., and then the reaction mixture was heated to reflux (at about 110° C.) for 6 hours. Sampling to NMR showed the completion of the reaction, and then the solvent and excess 4-Vinyl-cyclohexene oxide were removed by Rotovap to obtain 127 g the product $MD_{60.5}D^{CEP}{}_{7.5}M$ with 90% yield.

Synthesis of $MD_{169}D^{CEP}{}_{23}M$: To a 500 mL 3N dry flask were added 134.6 g (0.22 mol SiH) $MD_{169}D^H{}_{23}M$, 2 ppm Pt (Karstedt's catalyst)) and 100 mL toluene, followed by heating to 80° C. 38.3 g (0.3 mol) 4-Vinyl-cyclohexene oxide in 30 g toluene was added dropwise within 30 min at 80° C., and then the reaction mixture was heated to reflux (at about 110° C.) for 3 hours. Sampling to NMR showed the completion of the reaction, and then the solvent and excess 4-vinyl-cyclohexene oxide were removed by Rotovap to obtain 156 g the product $MD_{169}D^{CEP}{}_{23}M$ with 90.2% yield.

Synthesis of $M^{CEP}D_nM^{CEP}$ was performed as follows:

$M^{CEP}D_{12}M^{CEP}$: To a 500 mL 3N dry flask were added 56.64 g (0.115 mol SiH) $M^HD_{12}M^H$, 2 ppm Pt (Karstedt's catalyst)) and 80 mL toluene, followed by heating to 80° C. 14.6 g (0.117 mol) 4-Vinyl-cyclohexene epoxide in 20 g toluene was added dropwise within 20 min at 80° C., and then the reaction mixture was heated to reflux (at about 110° C.) for 3 hours. Sampling to NMR showed the completion of the reaction, and then the solvent and excess 4-vinyl-cyclohexene oxide were removed by Rotovap to obtain 64.5 g the product $M^{CEP}D_{12}M^{CEP}$ with 91% yield.

$M^{CEP}D_{845}M^{CEP}$: To a 1000 mL 3N dry flask were added 150 g (0.0048 mol SiH) $M^HD_{845}M^H$, 2 ppm Pt (Karstedt's catalyst)) and 150 mL toluene, followed by heating to 80° C. 0.62 g (0.005 mol) 4-Vinyl-cyclohexene oxide in 10 mL toluene was added dropwise within 10 min at 80° C., and then the reaction mixture was heated to reflux (at about 110° C.) for 3 hours. Sampling to NMR showed the completion of the reaction, and then the solvent and excess 4-vinyl-cyclohexene epoxide were removed by Rotovap to obtain 139 g the product $M^{CEP}D_{845}M^{CEP}$ with 92% yield.

Synthesis of $M_{10.3}T^{CEP}{}_{5.4}Q_{16.8}$ To a 3 L 3N flask with a magnetic stir-bar were added 500 g MQ-1600 resin (DOW-SIL™ MQ-1600 solid resin obtained from Dow Chemical Company) and 800 g toluene, followed by adding 337.6 g of 2-(3,4-epoxycyclohexyl)ethyl trimethoxysilane (obtained from Gelest) and 0.8 g KOH dissolved in 10 mL methanol. The mixture was stirred and refluxed at about 80° C. After cooling down, about 4.1 g acetic acid was added to neutralize the base, followed by stirred for 30 min. The reaction solution was filtered through 1 m filter and the volatiles was removed by a Rotovap at 60° C. and 10 mbar to yield clear and colorless resin product $M_{10.3}T^{CEP}{}_{5.4}Q_{16.8}$. Containing SiOZ %=32.1% mole of $^{29}$Si by $^{13}$C-NMR, Z=H and Me); GPC (vs. polystyrene): Mn=2,808, polydispersity=1.59.

NMR spectra were recorded on a Varian XL-400 spectrometer. Chemical shifts for $^1$H, $^{13}$C, and $^{29}$Si spectra were referenced to internal solvent resonance and are reported relative to tetramethylsilane.

Synthesis of TBP-CO$_2$—BCF: Working in a glovebox, 200 mg tri(t-butyl)phosphine (TBP) (1.0 mmol) and 500 mg (1 mmol) tris-pentafluorophenylborane (BCF) and 10 mL dry toluene were placed in a Schlenk flask equipped with a magnetic stir bar. The Schlenk flask was sealed and removed out from the glovebox and connected to a Schlenk line. The system was purged with nitrogen flow and then carbon dioxide was bubbled in for two minutes. Opened the Schlenk flask to the atmosphere of carbon dioxide and then replaced the cap to the flask with a septum. Inserted a needle through the septum to create an exit for the carbon dioxide gas and improve carbon 10 dioxide circulation. After 5 minutes a white solid precipitated from the reaction mixture. Sealed the flask and stirred at room temperature for an additional hour. Moved the flask to a glovebox. Added 20 mL of hexane and isolated the white solid by filtration through a glass frit. Washed the white solid with hexane three times (10 mL each time). The white solid is TBP-CO$_2$—BCF (540 mg, 71% yield).

In this Reference Example 2, samples of epoxy-curable silicone release coating composition samples were prepared as follows. First, an inhibited catalyst was prepared by mixing BCF with either an amine or with a Lewis base together with a bridging molecule. Mixing was performed in toluene as the solvent at 23° C. Mixing facilitates formation of the inhibited catalyst. The selection of amine or Lewis base and bridging molecule, and their amounts, are shown below in Table 2.

The epoxy-curable silicone release coating composition samples were then prepared as follows. An epoxy-functional polyorganosiloxane and an inhibited catalyst were mixed in amounts sufficient to provide 500 ppm BCF based on weight of the epoxy-curable silicone release coating composition using a Speedmixer™. In certain comparative examples, a polyorganohydrogensiloxane was added. The epoxy-functional polyorganosiloxane selected for each sample (and polyorganohydrogensiloxane, when used) is also shown below in Table 2.

In this Reference Example 3, each epoxy-curable silicone release coating composition samples prepared as described in Reference Example 2 was coated on glossy paper substrates (either Glassine Paper, GP; or thermal paper, TP) as 1 μm to 3 μm thick films, and then the coated films were cured in a 95° C. oven for 20 to 30 seconds. were evaluated as follows:

Cure performance of an epoxy-curable silicone release coating composition sample was evaluated by determining an extractable percent value (extractable %). In particular, a sample was coated and cured on a substrate (Glassine paper or thermal paper as described above) to form a coated substrate, which was immediately cut into three sample discs (die cutter, 1.375 inch (3.49 cm)) handled only by tweezers to minimize contamination and/or damage. Each sample disc was analyzed via XRF to determine an initial coat weight ($W^i{}_s$) before being placed in an individual bottle (100-mL, covered with a lid) containing solvent (methyl isobutyl ketone, 40 mL) and allowed to rest on a bench to soak for 30 minutes. Each sample disc was then removed from the bottle, placed coated-side-up on a clean surface (tissue paper) to allow residual solvent to evaporate (without blotting/wiping), and analyzed via XRF to determine a final coat weight ($W^f_s$). The extractable % of each sample is the percent change in coat weight from the solvent soak, i.e., is calculated using the formula: [($W^i_s$−$W^f_s$)/Wi]×100%). The extractable % indicates the amount of non-cured components of the sample composition (e.g. non-crosslinked silicone) extractable from the coated substrate, such as a lower extractable % indicates a higher/better cure performance.

The anchorage of an epoxy-curable silicone release coating composition sample was evaluated via anchorage index, i.e., by determining a percent rub-off resistance (ROR %) value. In particular, a sample was coated and cured on a substrate (Glassine paper or thermal paper) to form a coated substrate. Immediately following cure, the coated substrate was cut into two sample discs (die cutter, 1.375 inch (3.49 cm)), which are each analyzed via XRF to determine an initial coat weight ($W^i_a$). Each sample disc was then abraded with a felt under load (1.9 kg) using automated abrading equipment, in a method similar to a Taber-type abrasion test (e.g. such as that of ASTM D4060-19, "Standard Test Method for Abrasion Resistance of Organic Coatings by the Taber Abraser"), and subsequently analyzed via XRF to determine a final coat weight ($W^f_a$). The ROR % of each sample was calculated using the formula: [$W^f_s$/$W^i_s$]×100%).

The ROR % indicates how strong the coating was anchored to the substrate, such that a higher ROR % indicated a higher/better anchorage. The higher the ROR % value, the better.

In this Comparative Example 1 (C1), a hydrosilylation curable release coating composition was prepared as follows:

$Q(D_{40}M^{Vi})_4$, $MD_{18}D^H_{42}M$, 100 ppm Pt (DC 4000 INT] and inhibitor (1-ethynyl-1-cyclohexanol) were mixed in dental cup by SPEEDMIXER™. The ratio of [SiH]/[Vi] is 2:1. The formulation was coated on Glossy paper substrates as 1 to 3 μm thick films, and then the coated films were cured in 95° C. oven for 20 seconds. Samples were cut from the cured substrate for the measurement of Extractable % and ROR %.

In this Comparative Example 4 (C4), a hydrosilylation curable release coating composition was prepared as follows: Comparative Example 4 (C4):

$Q(D_{40}M^{Vi})_4$, $MD_{18}D^H_{42}M$, 100 ppm Pt (DC 4000 INT] and inhibitor (1-ethynyl-1-cyclohexanol) were mixed in dental cup by speedmixer. The ratio of [SiH]/[Vi] is 2:1. The formulation was coated on Thermal paper substrates as 1 to 3 μm thick films, and then the coated films were cured in 95° C. oven for 30 seconds. Samples were cut from the cured substrate for the measurement of Extractable % and ROR %.

TABLE 2

Epoxy-curable Silicone Release Coating Compositions and Results

| Spl | Siloxane | Catalyst | Ratio BCF:Inhibitor | Shelf life at rt. | Cure time at 95° C./Sec. | Substrate | Extractable % | ROR % |
|---|---|---|---|---|---|---|---|---|
| 1 | $MD_{60.5}D^{CEP}_{7.5}M$ | BCF-TEA | 1:1 | 8 h | 20 | GP | 3.3% | 99% |
| 2 | $MD_{117}D^{CEP}_{11.8}M$ | BCF-TEA | 1:1 | 8 h | 20 | GP | 5% | 97% |
| 3 | $MD_{169}D^{CEP}_{23}M$ | BCF-TEA | 1:1 | 3 h | 20 | GP | 0% | 99.6% |
| 4 | $M_{10.3}T^{CEP}_{5.4}Q_{16.8}$-Containing SiOZ % = 32.1% mole of Si by 13C-NMR, Z=H, and Me); GPC (vs. polystyrene): Mn = 2,808, polydispersity = 1.59 | BCF-TEA | 1:1 | >2 days | 20 | GP | 8.5% | 96% |
| 5 | $MD_{117}D^{CEP}_{11.8}M$ | TBP-$CO_2$-BCF | Not applicable | 6 h | 20 | GP | 5.15 | 98.7% |
| C1 | $Q(D_{40}M^{Vi})_4$ + $MD_{18}D^H_{42}M$ | Pt | N/A | >5 days | 20 | GP | 11.5% | 88.1% |
| C2 | $MD_{169}D^{CEP}_{23}M$ | No inhibitor | N/A | 1 min | NM* | NM* | NM* | NM* |
| C3 | $MD_{169}D^{CEP}_{23}M$ | BCF-TPA | 1:1 | 5 min | NM* | NM* | NM* | NM* |
| 6 | $MD_{169}D^{CEP}_{23}M$ | BCF-TEA | 1:1 | 3 h | 30 | TP | 0% | 99.1% |
| 7 | $MD_{169}D^{CEP}_{23}M$ | BCF-TBA | 1:1 | 3 h | 30 | TP | 3.7% | 98.4% |
| C4 | $Q(D_{40}M^{Vi})_4$ + $MD_{18}D^H_{42}M$ | Pt | N/A | >5 days | 30 | TP | 1% | 3.6% |
| C5 | $MD_{169}D^{CEP}_{23}M$ + $MD^H_{65}M$ | BCF-TEA | 1:1 | 10 h | 30 | TP | 5.5% | 77% |
| C6 | $MD_{169}D^{CEP}_{23}M$ + $MD^H_{65}M$ | TBP-$CO_2$-BCF | Not applicable | 5 h | 30 | TP | 8.8% | 0% |

In Table 2, NM means not measured.

By comparing the examples in Table 2, it can be seen that at the same cure conditions, (1) the commercial hydrosilylation cured composition (C1) showed worse cure and anchorage; (2) cyclic CEP containing compositions without inhibitors (C2) or with a weaker inhibitor TPA (C3) cured too fast at even rt., leading to a short shelf life (e.g., 1 and 5 min) which was too short for release coating applications; (3) CEP functional formulations (examples 1-4) with TEA as inhibitors showed much better performance than all comparative examples, i.e., all had improved cure (Extractable %<10%) and improved anchorage (ROR %>95%); (4) CEP containing composition (example 5) with TBP-$CO_2$—BCF as catalyst also showed good performance on GP substrate with good cure and anchorage (low extractable % and high ROR %). Generally speaking, as for glassine paper substrate, compositions with cyclic epoxy-functional groups performed very well from both cure and anchorage perspective even at lower cure temperature than the regular cure time for glassine paper—130-160° C., which reduces cost via energy consumption reduction and eliminate the paper remoisturizing step after coating cure step.

Thermal paper has a layer of coatings comprising thermochromic molecules which change color from colorless to much dark color upon heating over certain temperature (typically >100° C.). The typical hydrosilylation cure based thermally curable release coating composition cannot be used directly on thermal paper for two major reasons: First, typical thermally curable release coating compositions required higher cure temperature, like 130° C. to 160° C., which is too high for thermal paper. Second, the thermal coating layer on thermal paper contains sulfur, amine, and/or other Pt catalyst poisoning functional groups, which lead to under cure on the interface between release coating layer and the thermal paper. A good example is C4, which is a typical release coating composition for non-thermal sensitive substrates. At relatively lower cure temperature (95° C.), the system showed good cure (low extractable %), but poor anchorage (low ROR %) even with relatively high catalyst loading—100 ppm Pt. Examples 6 and 7 in Table 2 indicate that cyclic CEP functional polysiloxanes with a strong inhibitor (e.g., TEA or TBA) have a relatively longer shelf life at rt (vs using a weak inhibitor like TPA, C3 in Table 2), cure fast and well at 95° C. with low Extractable % values and excellent anchorage (ROR %>95%) on challenging thermal paper substrate.

The inventors surprisingly found that BCF catalyzed epoxy polymerization was more efficient than the BCF catalyzed coupling of SiH and epoxy under the conditions tested. Comparative examples C5 and C6 showed that the coupling of SiH and Si-CEP made the bulky film cure well (the low Extractable %), but had a poor cure at the interface proved by the low ROR % (77% for C5 and even 0% for example C6), compared with those of examples 6 and 7. Therefore, the epoxy-curable silicone release coating composition may be formulated to be free of compounds with silyl hydride moieties.

Problems to be Solved

There is a need in the release coating industry for curable release coating compositions that cure effectively and efficiently at relatively low temperatures, e.g., 70° C. to 100° C., or 70° C. to <100° C. or at 70° C. to 90° C., or at 85° C. because of the growing desire to use temperature sensitive substrates such as thermal paper, which do not withstand high curing temperatures (such as >100° C. to 130° C.).

In the past, thermal paper has not been considered for use as a substrate for thermally curable silicone release coating compositions because thermal paper cannot withstand the high curing temperatures required to cure such compositions via hydrosilylation. (The thermal paper would change color at the curing temperatures required.) And, the thermal coating layer on thermal paper can contain sulfur, amine, or other moieties which act as hydrosilylation catalyst poisons, leading to undercure on the interface between a release coating layer and the thermal paper, thereby causing poor anchorage. There is also an industry need for a curable silicone release coating composition curable to form a silicone release coating on a thermal paper substrate.

Solution

The epoxy-curable silicone release coating composition described herein has a new cure chemistry. The epoxy-curable silicone release coating composition is capable of curing to form a silicone release coating at relatively low temperatures with acceptable anchorage to substrates. The epoxy-curable silicone release coating composition is suitable for forming a silicone release coating on thermal paper.

The invention claimed is:

1. An epoxy-curable silicone release coating composition comprising:
   (A) an epoxy-functional polyorganosiloxane comprising unit formula
   $(R^1R^2R^3SiO_{1/2})_a(R^1SiO_{3/2})_c(SiO_{4/2})_d(ZO_{1/2})_e$, where each $R^1$ is independently selected from the group consisting of an alkyl group and an alkyl group functionalized with a cyclic epoxy-functional group, each $R^2$ is an alkyl group, each $R^3$ is an alkyl group, and subscript a>1, subscript c>1, subscript d>1, and e>0, and Mn is >2,000 g/mol to 200,000 g/mol;
   (B) an inhibited catalyst selected from the group consisting of
      (B-1) a complex comprising
         (i) a fluorinated triaryl borane; and
         (ii) an amine of formula $R^4R^5R^6N$, where and where each of $R^4$, $R^5$, and $R^6$ is independently selected from the group consisting of alkyl and substituted alkyl, and each of $R^4$, $R^5$, and $R^6$ is connected to the nitrogen by a non-conjugated carbon; and
      (B-2) a Bridged Frustrated Lewis Pair comprising a complex of
         (i) the fluorinated triaryl borane;
         (ii) a Lewis base selected from the group consisting of $PR^7_3$, $P(NR^7_2)_3$, $NR^7_3$, $N(SiR^7_3)_xR^7_{3-x}$, $P(N—R^7)R^7_3$ and

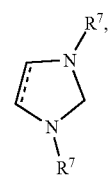

where each $R^7$ is independently selected from the group consisting of hydrogen, alkyl, substituted alkyl, aryl, and substituted aryl; and
         (iii) a bridging molecule connecting the fluorinated triaryl borane and the Lewis base, where the bridging molecule is selected from the group consisting of carbon dioxide, $H_2$, nitriles, alkenes, alkynes, ketones, esters and aldehydes.

2. The composition of claim 1 where the fluorinated triaryl borane has formula

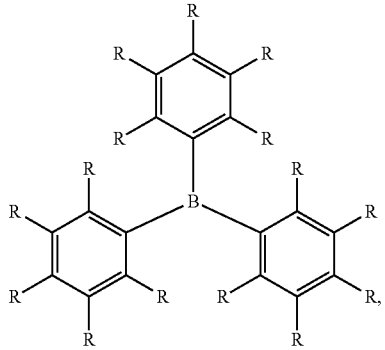

where each R is independently selected from the group consisting of H, F and $CF_3$, with the proviso that at least one instance of R per molecule is F or $CF_3$.

3. The composition of claim 1 where the amine is a trialkyl amine.

4. The composition of claim 3, where the trialkyl amine is selected from the group consisting of triethylamine, tripropylamine, tributylamine, tripentylamine and trihexylamine.

5. The composition of claim 1, where the Lewis base is $PR^7_3$, and each $R^7$ is an alkyl group.

6. The composition of claim 1, where the bridging molecule is carbon dioxide.

7. A method for preparing the epoxy-curable silicone release coating composition comprising:

(A) an epoxy-functional polyorganosiloxane comprising unit formula $(R^1R^2R^3SiO_{1/2})_a(R^1 SiO_{3/2})_c(SiO_{4/2})_d(ZO_{1/2})_e$, where each $R^1$ is independently selected from the group consisting of an alkyl group and an alkyl group functionalized with a cyclic epoxy-functional group, each $R^2$ is an alkyl group, each $R^3$ is an alkyl group, and subscript a>1, subscript c>1, subscript d>1, and e>0, and Mn is >2,000 g/mol to 200,000 g/mol;

(B) an inhibited catalyst selected from the group consisting of (B-1) a complex comprising
(i) a fluorinated triaryl borane; and
(ii) an amine of formula $R^4R^5R^6N$, where, and where each of $R^4$, $R^5$, and $R^6$ is independently selected from the group consisting of alkyl, and substituted alkyl, and each of $R^4$, $R^5$, and $R^6$ is connected to the nitrogen by a non-conjugated carbon; and (B-2) a Bridged Frustrated Lewis Pair comprising a complex of
(i) the fluorinated triaryl borane;
(ii) a Lewis base selected from the group consisting of $PR^7_3$, $P(NR^7_2)_3$, $NR^7_3$, $N(SiR^7_3)_xR^7_{3-x}$, $P(N-R^7)R^7_3$ and

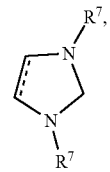

where each $R^7$ is independently selected from the group consisting of hydrogen, alkyl, substituted alkyl, aryl, and substituted aryl; and (iii) a bridging molecule connecting the fluorinated triaryl borane and the Lewis base, where the bridging molecule is selected from the group consisting of carbon dioxide, $H_2$, nitriles, alkenes, alkynes, ketones, esters and aldehydes, where the method comprises mixing, under ambient conditions, starting materials comprising (A) and (B).

8. The method of claim 7, further comprising coating the epoxy-curable silicone release coating composition on a substrate.

9. The method of claim 8, where the substrate comprises glassine paper.

10. The method of claim 8, where the substrate comprises thermal paper.

11. The method of claim 8, further comprising heating the epoxy-curable silicone release coating composition at 80° C. to 95° C. for 10 seconds to 50 seconds to cure.

* * * * *